United States Patent
Wu

(10) Patent No.: US 10,950,390 B2
(45) Date of Patent: *Mar. 16, 2021

(54) STACKED TYPE CAPACITOR WITHOUT CARBON PASTE LAYER, MANUFACTURING METHOD THEREOF AND SILVER PASTE LAYER

(71) Applicant: ANDAQ TECHNOLOGY CO., LTD., Taipei (TW)

(72) Inventor: Chia-Yu Wu, New Taipei (TW)

(73) Assignee: ANDAQ TECHNOLOGY CO., LTD., Taipei (TW)

( * ) Notice: Subject to any disclaimer, the term of this patent is extended or adjusted under 35 U.S.C. 154(b) by 42 days.

This patent is subject to a terminal disclaimer.

(21) Appl. No.: 16/415,675

(22) Filed: May 17, 2019

(65) Prior Publication Data

US 2020/0098527 A1 Mar. 26, 2020

(30) Foreign Application Priority Data

Sep. 21, 2018 (TW) ................................. 107133403

(51) Int. Cl.
*H01G 9/00* (2006.01)
*H01G 9/025* (2006.01)

(52) U.S. Cl.
CPC .......... *H01G 9/155* (2013.01); *H01G 9/0029* (2013.01); *H01G 9/025* (2013.01); *H01G 2009/0007* (2013.01); *H01G 2009/0014* (2013.01)

(58) Field of Classification Search
CPC .... H01G 9/012; H01G 9/0425; H01G 9/0036; H01G 9/028; H01G 9/14; H01G 9/08; H01G 9/15; H01G 9/055; H01G 9/0029; H01G 9/26; H01B 1/22; C09J 9/02; C09J 129/04

See application file for complete search history.

(56) References Cited

U.S. PATENT DOCUMENTS

| | | | |
|---|---|---|---|
| 8,559,165 B2* | 10/2013 | Matsuoka | H01G 9/028 361/525 |
| 2017/0352491 A1* | 12/2017 | Chen | H01G 9/025 |
| 2018/0108489 A1* | 4/2018 | Nakata | H01G 9/15 |
| 2019/0153242 A1* | 5/2019 | Chen | C09D 179/04 |

(Continued)

FOREIGN PATENT DOCUMENTS

CN 106067380 A * 11/2016 ............ H01G 9/025

*Primary Examiner* — Nathan Milakovich
(74) *Attorney, Agent, or Firm* — Li & Cai Intellectual Property (USA) Office

(57) ABSTRACT

A stacked type capacitor without carbon paste layer includes a metal foil, an oxide layer, a polymer composite layer and a silver paste layer. The oxide layer is formed on the outer surface of the metal foil to entirely enclose the metal foil. The polymer composite layer is formed on the oxide layer to partially enclose the oxide layer. The silver paste layer is directly formed on the polymer composite layer to directly enclose the polymer composite layer. The oxide layer and the polymer composite layer are connected with each other to form a first connection interface between the oxide layer and the polymer composite layer. The polymer composite layer and the silver paste layer are connected with each other without a carbon paste layer to form a second connection interface between the polymer composite layer and the silver paste layer.

9 Claims, 4 Drawing Sheets

(56) References Cited

U.S. PATENT DOCUMENTS

2019/0272930 A1\* 9/2019 Yoshiike ................ H01B 1/22
2020/0082991 A1\* 3/2020 Wu ....................... H01G 9/151
2020/0082993 A1\* 3/2020 Wu ....................... H01G 9/10

\* cited by examiner

STACKED TYPE CAPACITOR WITHOUT CARBON PASTE LAYER, MANUFACTURING METHOD THEREOF AND SILVER PASTE LAYER

CROSS-REFERENCE TO RELATED PATENT APPLICATION

This application claims the benefit of priority to Taiwan Patent Application No. 107133403, filed on Sep. 21, 2018. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the present disclosure described herein. All references cited and discussed in this specification are incorporated herein by reference in their entireties and to the same extent as if each reference was individually incorporated by reference.

FIELD OF THE PRESENT DISCLOSURE

The present disclosure relates to a stacked type capacitor, a manufacturing method thereof and a silver paste layer, and more particularly to a stacked type capacitor without a carbon paste layer, a manufacturing method thereof, and a silver paste layer.

BACKGROUND OF THE PRESENT DISCLOSURE

Capacitors have been widely used in consumer appliances, computer motherboards and peripherals thereof, power supplies, communication products, and basic components for automobiles. The main functions of capacitors, including filtering, bypassing, rectifying, coupling, decoupling and switching, make them indispensable components in electronic products. Capacitors are available in different types depending on their materials and applications, which include aluminum electrolytic capacitors, tantalum electrolytic capacitors, multilayer ceramic capacitors and film capacitors. A conventional solid electrolytic capacitor enjoys the advantages of having a small size, large capacitance and superior frequency characteristics, and can be used for decoupling a power supply circuit of a central processing unit. In general, a plurality of capacitor units can be stacked to form a conventional high-capacity solid electrolytic capacitor which includes a plurality of capacitor units and lead frames. Each of the capacitor units includes an anode portion, a cathode portion and an insulating portion, and the insulating portion electrically insulates the anode portion from the cathode portion. However, each capacitor unit still needs to use a carbon paste layer, which leaves room for improvement.

SUMMARY OF THE PRESENT DISCLOSURE

In response to the above-referenced technical inadequacies, the present disclosure provides a stacked type capacitor without a carbon paste layer, a manufacturing method thereof, and a silver paste layer.

In one aspect, the present disclosure is directed to a stacked type capacitor without a carbon paste layer, which includes a metal foil, an oxide layer, a polymer composite layer, and a silver paste layer. The oxide layer is formed on an outer surface of the metal foil to entirely enclose the metal foil. The polymer composite layer is formed on the oxide layer to partially enclose the oxide layer. The silver paste layer is formed directly on the polymer composite layer to directly enclose the polymer composite layer. The oxide layer and the polymer composite layer are connected with each other to form a first connection interface between the oxide layer and the polymer composite layer. The polymer composite layer and the silver paste layer are connected with each other directly without the carbon paste layer to form a second connection interface between the polymer composite layer and the silver paste layer.

In another aspect, the present disclosure is directed to a manufacturing method for a stacked type capacitor without a carbon paste layer. The manufacturing method includes: providing a metal foil; forming an oxide layer on an outer surface of the metal foil to entirely enclose the metal foil; forming a polymer composite layer on the oxide layer to partially enclose the oxide layer; and forming a silver paste layer directly on the polymer composite layer to directly enclose the polymer composite layer. The oxide layer and the polymer composite layer are connected with each other to form a first connection interface between the oxide layer and the polymer composite layer. The polymer composite layer and the silver paste layer are connected with each other directly without the carbon paste layer to form a second connection interface between the polymer composite layer and the silver paste layer.

In another aspect, the present disclosure is directed to a silver paste layer for a stacked type capacitor without a carbon paste layer. The silver paste layer includes 40-90% by weight of silver powder, 0.1-5% by weight of a dispersant, 1-10% by weight of a water-soluble resin, 5-40% by weight of a solvent, and a remaining percentage by weight of water.

Therefore, through the technical features of "the polymer composite layer is formed on the oxide layer to partially enclose the oxide layer" and "the silver paste layer is directly formed on the polymer composite layer to directly enclose the polymer composite layer," the stacked type capacitor that does not require the use of a carbon paste layer, the manufacturing method thereof, and the silver paste layer allow the oxide layer and the polymer composite layer to be connected with each other to form the first connection interface between the oxide layer and the polymer composite layer, and allows the polymer composite layer and the silver paste layer to be directly connected with each other to form the second connection interface between the polymer composite layer and the silver paste layer.

These and other aspects of the present disclosure will become apparent from the following description of certain embodiments taken in conjunction with the following drawings and their captions, although variations and modifications therein may be affected without departing from the spirit and scope of the novel concepts of the present disclosure.

BRIEF DESCRIPTION OF THE DRAWINGS

The present disclosure will become more fully understood from the detailed description and the accompanying drawings, in which.

DETAILED DESCRIPTION OF THE EXEMPLARY EMBODIMENTS

Figure 1:
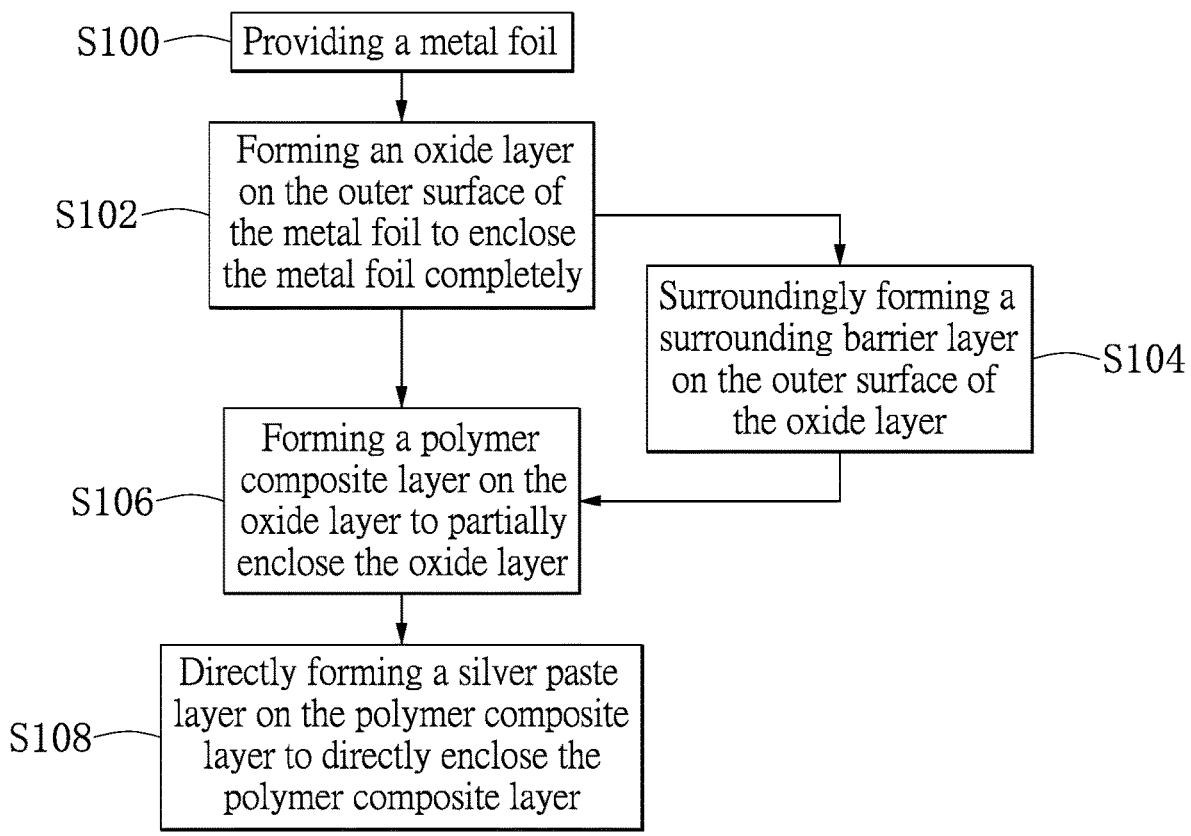
FIG. 1 is a flowchart of a manufacturing method for a stacked type capacitor according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Referring to FIGS. 1-5, a first embodiment of the present disclosure provides a manufacturing method for a stacked type capacitor S without a carbon paste layer.

Figure 2:
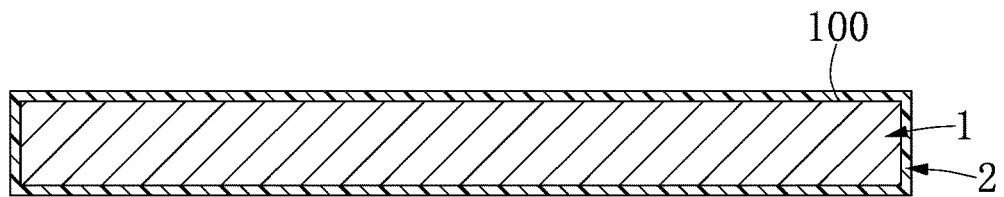
FIG. 2 is a cross-sectional view of the stacked type capacitor undergone the steps S100 and S102 of the manufacturing method for the stacked type capacitor according to the first embodiment of the present disclosure.

Referring to FIGS. 1 and 2, the manufacturing method for the stacked type capacitor S according to the present disclosure includes: providing a metal foil 1 (S100), and forming an oxide layer 2 on an outer surface 100 of the metal foil 1 to enclose the metal foil completely (S102). In certain embodiments, based on different use requirements, the metal foil 1 may be made of aluminum, copper or any metal material, and the surface of the metal foil 1 has a porous corroded layer, so the metal foil 1 may be a corroded foil having a porous corroded layer. When the metal foil 1 is oxidized, the oxide layer 2 is formed on the surface of the metal foil 1, and the metal foil 1 on which the oxide layer 2 is formed can be referred to as a valve metal foil. However, the present disclosure is not limited to the examples given above.

Figure 3:
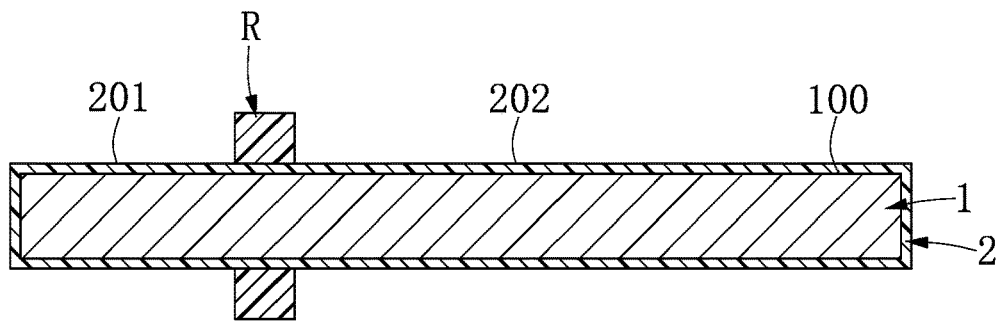
FIG. 3 is a cross-sectional view of the stacked type capacitor undergone the step S104 of the manufacturing method for the stacked type capacitor according to the first embodiment of the present disclosure.

Referring to FIGS. 1-3, the manufacturing method for the stacked type capacitor S according to the present disclosure further includes: surroundingly forming a surrounding barrier layer R on the outer surface of the oxide layer 2 (S104) so as to divide the outer surface of the oxide layer 2 into a first portion 201 and a second portion 202 that are separated from each other. In certain embodiments, based on different use requirements, the surrounding barrier layer R can be a conductive layer made of any kind of conductive material, for example, aluminum or copper, or an insulating layer made of any kind of insulation material, for example, epoxy or silicon. It is noted that based on different use requirements, the manufacturing method for the stacked type capacitor S may skip step S104, that is, the manufacturing method for the stacked type capacitor S does not necessarily require the use of the surrounding barrier layer R. However, the present disclosure is not limited by the examples given above.

Figure 4:
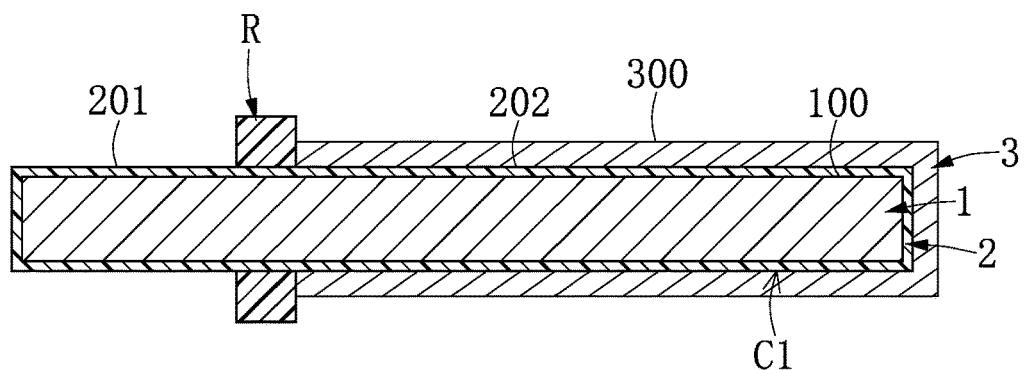
FIG. 4 is a cross-sectional view of the stacked type capacitor undergone the step S106 of the manufacturing method for the stacked type capacitor according to the first embodiment of the present disclosure.

Referring to FIGS. 1, 3 and 4, after step S102 or step S104, the manufacturing method for the stacked type capacitor S according to the present disclosure further includes: forming a polymer composite layer 3 on the oxide layer 2 to partially enclose the oxide layer 2 (S106). For example, when the outer surface of the oxide layer 2 is divided by the surrounding barrier layer R into the first portion 201 and the second portion 202 that are separate from each other, the polymer composite layer 3 is formed on the second portion 202 and encloses the second portion 202 completely. In certain embodiments, based on different use requirements, the material used for the polymer composite layer 3 can include 1-5% by weight of an emulsifier, 0.1-5% by weight of a PEDOT:PSS composite, 1-30% by weight of a conductive auxiliary (or a solvent having a high boiling point), 0.1-15% by weight of a hydrogen bond type adhesive, 0.01-5% by weight of a silane coupling agent, 0.5-5% by weight of a water-soluble resin, 0.001-1% by weight of a polyamine compound, and water for the remaining percentage by weight. It is noted that among the above-referenced materials, the emulsifier may be omitted. However, the present disclosure is not limited to the examples given above.

In certain embodiments, the conductive auxiliary may be selected from the group consisting of polyol, dimethyl sulfoxide (DMSO) and N-Methyl-2-Pyrrolidone (NMP). The hydrogen bond type adhesive may be selected from the group consisting of sorbitol and polyvinyl alcohol. The silane coupling agent may be selected from the group consisting of (3-Glycidyloxypropyl)triethoxysilane, (3-Aminopropyl)triethoxy silane, (3-Mercaptopropyl)trimethoxysilane, 3-Methacryloxypropyltrimethoxysilane, Vinyltrimethoxysilane, and Triethoxyoctylsilane. Water-soluble resin may be selected from the group consisting of water-based polyurethane, water-based polyethylene, polyester, and water-based polymethylmethacrylate. Polyol may be selected from the group consisting of ethylene glycol, glycerol, polyethylene glycol and polyglycefine. Polyamine may be selected from the group consisting of aliphatic amines, amides, aromatic amines, amino acids, polymeric amines, and polyether amines. Aliphatic amines may include α,ω-diamines, for example, 1,4-diaminocyclohexane, or 1,4-bisaminomethyl(cyclohexane). Linear aliphatic α,ω-diamines or the derivatives thereof may exemplarily be ethylenediamine, 1,6-hexanediamine, 1,7-heptanediamine, 1,8-octanediamine, 1,9-nonanediamine, 1,10-decanediamine, 1,12-dodecanediamine, N,N-dimethylethylenediamine, N,N,N'N'tetramethyl-1,4,butanediamine, N,N,N,N'N'N'-hexamethylhexane methylene-diammonium dibromide, piperazine, 1-(3-aminopropyl)piperazine, 1-(2-aminoethyl)piperazine, 1,4-diazabicyclo[2.2.2]octane, N,N,N'N-tetrakis(2-hydroxypropyl)ethylenediamine, N-[3-(trimethoxysilyl)propyl]ethylenediannine or 1,4-bis(3-amino-propyl) piperazine. Amides may exemplarily be N,N'-diacetyl-1,6-hexanediamine, N,N,N'N'-tetraacetylethylene-diamine, 1,4-diformylpiperazines, or N,N'-ethylenebis(stearamide). Aliphatic amines may include linear aliphatic amines having at least three amines, for example, 1,4-Bis(3-aminopropyl) piperazine, N-(6-aminohexyl)-1,6-diaminohexane, N-(3-aminopropyl)-1,4-diaminobutane, and 3-[2-(2-aminoethyl-amino)ethyleneamino]propyltrimethoxysilane. Aromatic amines having at least two amines may exemplarily be brilliant green, 4,4'-methylenebis(N,N-diglycidylaniline), o-phenylene-di-amine, m-phenylenediamine, p-phenylenediamine, 1,5-diaminonaphthalene, 1,8-diaminonaphthalene, 2,3-diaminonaphthalene, 3-aminophenyl sulfone, 4-aminophenyl sulfone, 4-aminophenyl ether, 3-3'-diaminobenzidine, 2-(4-aminophenyl)ethylamine, 4,4'-methylenendianiline, 2,6-diaminotoluene, N,N,N'N'-tetramethyl-p-phenylenediamine, 4,4'-bis(diethylamino)benzophenone, 4,4'-bis(dimethyl-amino)benzhydrol, 3,3',5,5'-tetramethylbenzidine, Auramine O, Rubine S, m-xylenediamine, phthalein, complexone, Brilliant Blue G or folic acid. Aromatic triamines may exemplarily be 4,4',4"-methyliditetris (N,N-dimethylaniline). Polyamines may exemplarily be poly(propylene glycol)bis(2-aminopropyl) ether, poly ethyleneimine, poly (ally lamine), and ethoxylated poly ethyl enimine. Polyethers may exemplarily be selected from the group consisting of NH2-(CH2)x(CH2CH2O)y(CH2)z-NH2, wherein each of x and z is an integer from 0 to 3, and y is an integer from 2 to 8, and imidazole derivatives, for example, 1-(3-aminopropyl)imidazole. However, the present disclosure is not limited thereto.

Figure 5:
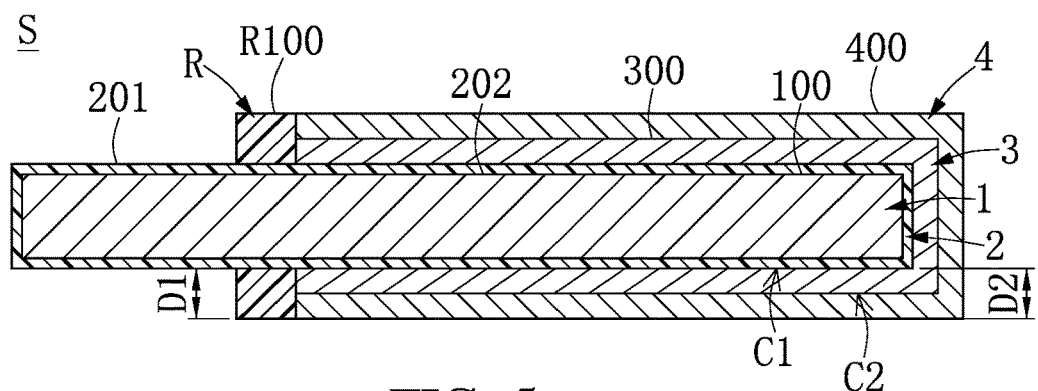
FIG. 5 is a cross-sectional view of the stacked type capacitor undergone the step S108 of the manufacturing method for the stacked type capacitor according to the first embodiment of the present disclosure.

Further, as shown in FIG. 1, FIG. 4 and FIG. 5, the manufacturing method for the stacked type capacitor S further includes: directly forming a silver paste layer 4 on the polymer composite layer 3 to directly enclose the polymer composite layer 3 (S108). For example, the silver paste layer 4 is formed on an outer surface 300 of the polymer composite layer 3 and completely encloses the outer surface 300 of the polymer composite layer 3. For example, according to different use requirements, the material used for the silver paste layer 4 may include 40-90% by weight of silver powder, 0.1-5% by weight of a dispersant, 1-10% by weight of a water-soluble resin, 5-40% by weight of a solvent, and water for the remaining percentage by weight. However, the present disclosure is not limited thereto.

Further, for example, the silver powder has a particle size between 1 and 50 μm, and the silver powder can be of various shapes such as silver balls, silver sheets and the like. The dispersant may be a hyperdispersant with an acid group or an amino group. Water-soluble resin may be selected from the group consisting of water-based polyurethane, water-based polyethylene, polyester, and water-based polymethyl methacrylate. The solvent is selected from the group consisting of polyol, methyl ethyl ketone, methyl isobutyl ketone, and butyl acetate. Polyol is selected from the group consisting of ethylene glycol, glycerol, polyethylene glycol, polyglycefine, ethylene glycol monobutylether, and ethylene glycol butyl ether. However, the present disclosure is not limited thereto.

For example, as shown in FIG. 5, a distance D1 from an outer peripheral surface R100 of the surrounding barrier layer R relative to the oxide layer 2 may be greater than, less than or equal to a distance D2 from an outer surface 400 of the silver paste layer 4 to the oxide layer 2. That is, when the distance D1 from the outer peripheral surface R100 of the surrounding barrier layer R to the oxide layer 2 is greater than, less than or equal to the distance D2 from the outer surface 400 of the silver paste layer 4 to the oxide layer 2, both the polymer composite layer 3 and the silver paste layer 4 are restricted by the surrounding barrier layer R and do not cross the surrounding barrier layer R. In addition, one end of the polymer composite layer 3 and one end of the silver rubber layer 4 are in contact with or separated from the surrounding barrier layer R, so that the length of the polymer composite layer 3 and the length of the silver paste layer 4 are both restricted by the surrounding barrier layer R. However, the present disclosure is not limited thereto.

It should be noted that, as shown in FIG. 5, the oxide layer 2 and the polymer composite layer 3 are connected with each other to form a first connection interface C1 between the oxide layer 2 and the polymer composite layer 3, and the polymer composite layer 3 and the silver paste layer 4 are directly connected with each other without a carbon paste layer, so as to form a second connection interface C2 between the polymer composite layer 3 and the silver paste layer 4. That is to say, the polymer composite layer 3 and the silver paste layer 4 are directly connected with each other to form a two-layer structure, so that no carbon paste layer exists between the polymer composite layer 3 and the silver paste layer 4.

Furthermore, as shown in FIG. 5, the first embodiment of the present disclosure further provides the stacked type capacitor S that does not require the use of a carbon paste layer, which includes the metal foil 1, the oxide layer 2, the polymer composite layer 3 and the silver paste layer 4. The oxide layer 2 is formed on the outer surface 100 of the metal foil 1 to completely enclose the metal foil 1. The polymer composite layer 3 is formed on the oxide layer 2 to partially enclose the oxide layer 2. The silver paste layer 4 is directly formed on the polymer composite layer 3 to directly enclose the polymer composite layer 3. Further, the oxide layer 2 and the polymer composite layer 3 are connected with each other to form the first connection interface C1 between the oxide layer 2 and the polymer composite layer 3, and the polymer composite layer 3 and the silver paste layer 4 are directly connected with each other without a carbon paste layer to form the second connection interface C2 between the polymer composite layer 3 and the silver paste layer 4.

For example, as shown in FIG. 5, the stacked type capacitor S that does not require the use of a carbon paste layer further includes the surrounding barrier layer R, and the surrounding barrier layer R is circumferentially formed on an outer surface of the oxide layer 2 to divide the outer surface of the oxide layer 2 into the first portion 201 and the second portion 202 which are separated from each other. In addition, the polymer composite layer 3 is formed on and completely encloses the second portion 202 of the oxide layer 2, and the silver paste layer 4 is formed on and completely encloses the polymer composite layer 3. However, the present disclosure is not limited thereto.

For example, as shown in FIG. 5, the distance D1 from the outer peripheral surface R100 of the surrounding barrier layer R to the oxide layer 2 may be greater than, less than or equal to the distance D2 from the outer surface 400 of the silver paste layer 4 to the oxide layer 2. That is, when the distance D1 from the outer peripheral surface R100 of the surrounding barrier layer R to the oxide layer 2 is greater than, less than or equal to the distance D2 from the outer surface 400 of the silver paste layer 4 to the oxide layer 2, the polymer composite layer 3 and the silver paste layer 4 are restricted by the surrounding barrier layer R and do not cross the surrounding barrier layer R. In addition, one end of the polymer composite layer 3 and one end of the silver rubber layer 4 are in contact with or separated from the surrounding barrier layer R, so that the length of the polymer composite layer 3 and the length of the silver paste layer 4 are both restricted by the surrounding barrier layer R. However, the present disclosure is not limited thereto.

It is to be noted that, as shown in FIG. 5, the first embodiment of the present disclosure provides the polymer composite layer 3 applicable to the stacked type capacitor S which requires no carbon paste layer. The stacked type capacitor S includes the metal foil 1, the oxide layer 2, the polymer composite layer 3 and the silver paste layer 4. Further, the oxide layer 2 is formed on the outer surface of the metal foil 1 to completely enclose the metal foil 1, and the polymer composite layer 3 is formed on the oxide layer 2 to partially enclose the oxide layer 2. Silver paste layer 4 is directly formed on the polymer composite layer 3 to directly enclose the polymer composite layer 3. The polymer composite layer 3 may further include a bottom layer and a soluble nanoparticle polymer enclosing layer. The polymer composite layer 3 is formed by first forming the bottom layer on the oxide layer 2, and then forming the soluble nanoparticle polymer enclosing layer. The bottom layer formed on the oxide layer 2 may have a thickness of less than 1 μm. For example, the bottom layer may include a plurality of soluble nanoparticles, and the soluble nanoparticles are made of nano-scale conductive polymer materials, and may be made of aniline, polypyrrole, polythiophene, PEDOT:PSS composite or any combination thereof. It is worth mentioning that the bottom layer can be formed by multiple coating and drying steps. For example, the coating-drying step can be repeated 3 to 15 times to ensure the effectiveness of the bottom layer. Furthermore, the bottom layer may be a chemically polymerized polymer bottom layer, a soluble nanoparticle polymer bottom layer, or the two being formed sequentially on the oxide layer 2. For example, according to different use requirements, the material used for the polymer composite layer 3 includes 1-5% by weight of an emulsifier, 0.1-5% by weight of a PEDOT:PSS composite, 1-30% by weight of a conductive auxiliary (or a solvent having a high boiling point), 0.1-15% by weight of hydrogen bond type adhesive, 0.01-5% by weight of silane coupling agent, 0.5-5% by weight of a water-soluble resin, 0.001-1% by weight of polyamine compound, and water for the remaining percentage by weight. In particular, among the materials used for the polymer composite layer 3, the emulsifier can be omitted. However, the present disclosure is not limited thereto.

Solid electrolytic capacitors use solid electrolytes instead of liquid electrolytes as cathodes, and conductive polymers have been widely used as cathode materials for solid electrolytic capacitors because of their high electrical conductivity and easy manufacturing processes. The conductive polymer materials include polyaniline (PAni), polypyrrole (PPy), polythiophene (PTh) and derivatives thereof. PEDOT:PSS has excellent electrical conductivity. A PEDOT:PSS composite has a lower polymerization rate than other polymers such as PAni and PPy, and therefore can undergo polymerization reactions at normal temperature to reduce the difficulty of its preparation. In addition, the PEDOT:PSS composite has better weather resistance and heat resistance than other polymers. Further, the PEDOT:PSS composite also has good dispersibility, low production cost, high transparency, and excellent processability. Therefore, Using a PEDOT:PSS composite as a raw material for forming the polymer composite layer 3 on a cathode portion of a capacitor contributes greatly to the improvement of the electrical effects of the capacitor.

It should be noted that, as shown in FIG. 5, the first embodiment of the present disclosure provides the silver paste layer 4 applicable to the stacked type capacitor S that does not require the use of a carbon paste layer, and the stacked type capacitor S includes the metal foil 1, the oxide layer 2, the polymer composite layer 3, and the silver paste layer 4. Further, the oxide layer 2 is formed on the outer surface of the metal foil 1 to completely enclose the metal foil 1, and the polymer composite layer 3 is formed on the oxide layer 2 to partially enclose the oxide layer 2. The silver paste layer 4 is directly formed on the polymer composite layer 3 to directly enclose the polymer composite layer 3. For example, according to different use requirements, the material used for the silver paste layer 4 includes 40-90% by weight of silver powder, 0.1-5% by weight of a dispersant, 1-10% by weight of a water-soluble resin, and 5-40% by weight of a solvent, and water for the remaining percentage by weight. However, the present disclosure is not limited thereto.

Figure 6:
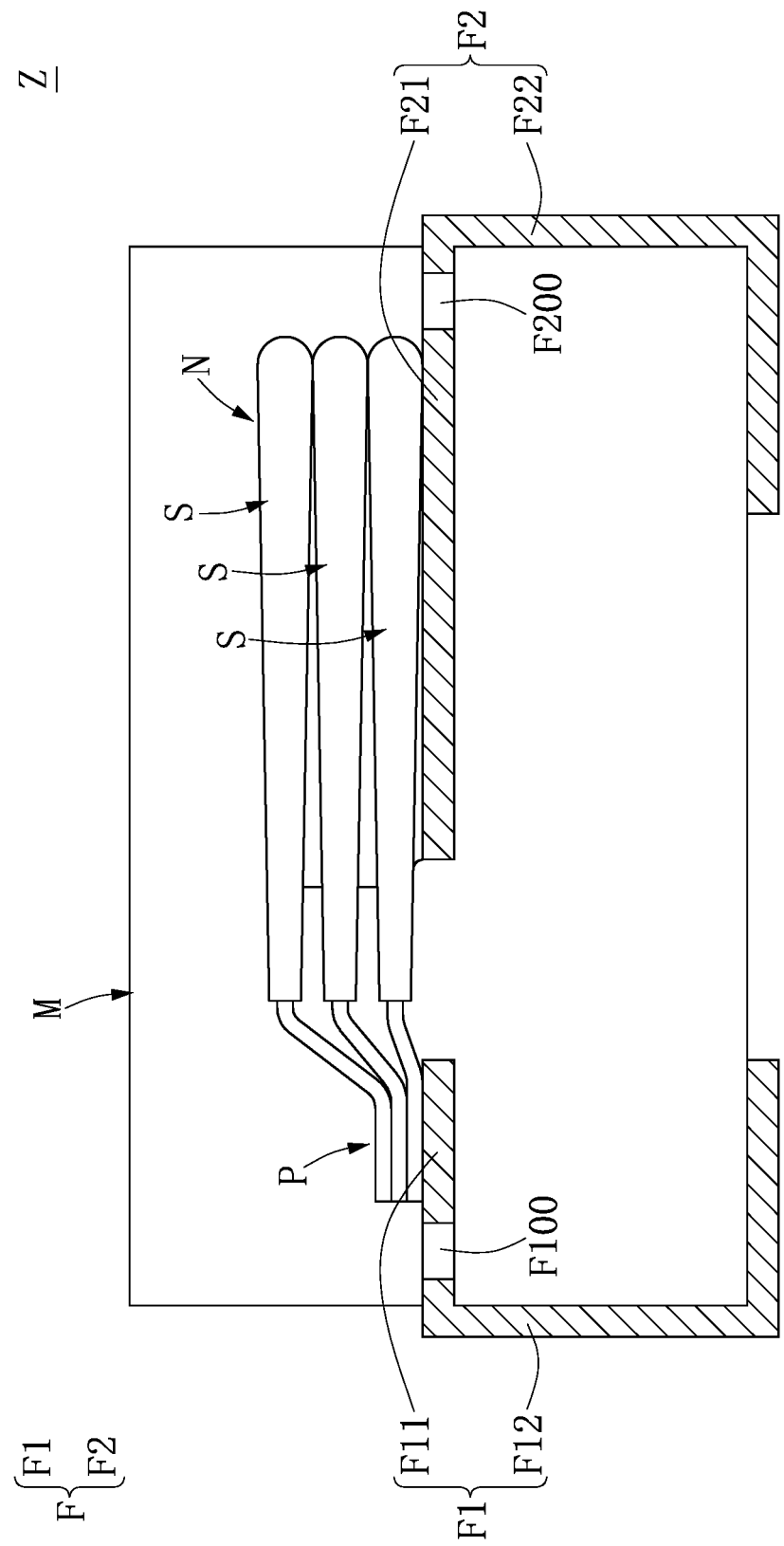
FIG. 6 is a cross-sectional view of a stacked type capacitor package structure according to a first embodiment of the present disclosure.

It is noted that, as shown in FIG. 6, the first embodiment of the present disclosure further provides a stacked type capacitor package structure Z that does not require the use of a carbon paste layer, and includes a conductive bracket F, a plurality of stacked type capacitors S and a package encapsulant M.

First, as shown in FIG. 6, the conductive support F includes at least one positive electrode conductive terminal F1 and at least one negative electrode conductive terminal F2 separated from the at least one positive conductive terminal F1. Further, the at least one positive electrode conductive terminal F1 has a first embedded portion F11, a first exposed portion F12, and at least one first through hole F100 penetrating through the first embedded portion F11. In addition, the at least one negative electrode conductive terminal F2 has a second embedded portion F21, a second exposed portion F22, and at least one second through hole F200 penetrating through the second embedded portion F21.

Furthermore, as shown in FIG. 5 and FIG. 6, a plurality of stacked type capacitors S are stacked in sequence and disposed between the at least one positive electrode conductive terminal F1 and the at least one negative electrode conductive terminal F2, and each stacked type capacitor S has a positive electrode terminal P and a negative electrode terminal N. For example, as shown in FIG. 5, each stacked type capacitor S includes the metal foil 1, the oxide layer 2, the polymer composite layer 3, and the silver paste layer 4. The oxide layer 2 is formed on the outer surface of the metal foil 1 to completely enclose the metal foil 1. The polymer composite layer 3 is formed on the oxide layer 2 to partially enclose the oxide layer 2. The silver paste layer 4 is directly formed on the polymer composite layer 3 to directly enclose the polymer composite layer 3.

Further, as shown in FIG. 6, all of the plurality of stacked type capacitors S and a portion of the conductive bracket F are covered by and embedded in the package encapsulant M. Further, the plurality of stacked type capacitors S, the first embedded portion F11 of the positive electrode conductive terminal F1, and the second embedded portion F21 of the negative electrode conductive terminal F2 are completely covered by and embedded in the package encapsulant M, and the first exposed portion F12 of the positive electrode conductive terminal F1 and the second exposed portion F22 of the negative electrode conductive terminal F2 are exposed outside the package encapsulant M. It should be noted that the at least one first through hole F100 of the positive electrode conductive terminal F1 and the at least one second through hole F200 of the negative electrode conductive terminal F2 are filled by the package encapsulant M, so the bonding strength between the conductive bracket F and the package encapsulant M can be effectively increased, so as to increase the structural strength of the stacked type capacitor package structure Z itself and the electrical characteristics it provides.

It is noted that since the material used in the polymer composite layer 3 and the material used in the silver paste layer 4 have water-soluble resins, the compatibility between the polymer composite layer 3 and the silver paste layer 4 is good. The interface resistance between the polymer composite layer 3 and the silver paste layer 4 is low, and the two has a lower equivalent series resistance (ESR). For example, a conventional phenolic resin type silver paste has an ESR of about 100 to 500 milliohms, and a conventional epoxy type silver paste has an ESR of about 500 to 1000 milliohms, while the aqueous resin type silver paste of the present disclosure has an ESR about 3 to 80 milliohms. In addition to a reduced ESR, while dispensing the use of a carbon paste layer, the capacitance (Cap), dissipation factor (DF) and leakage current (LC) of the stacked type capacitor package structure Z of the present disclosure still meet requirements.

Second Embodiment

Figure 7:
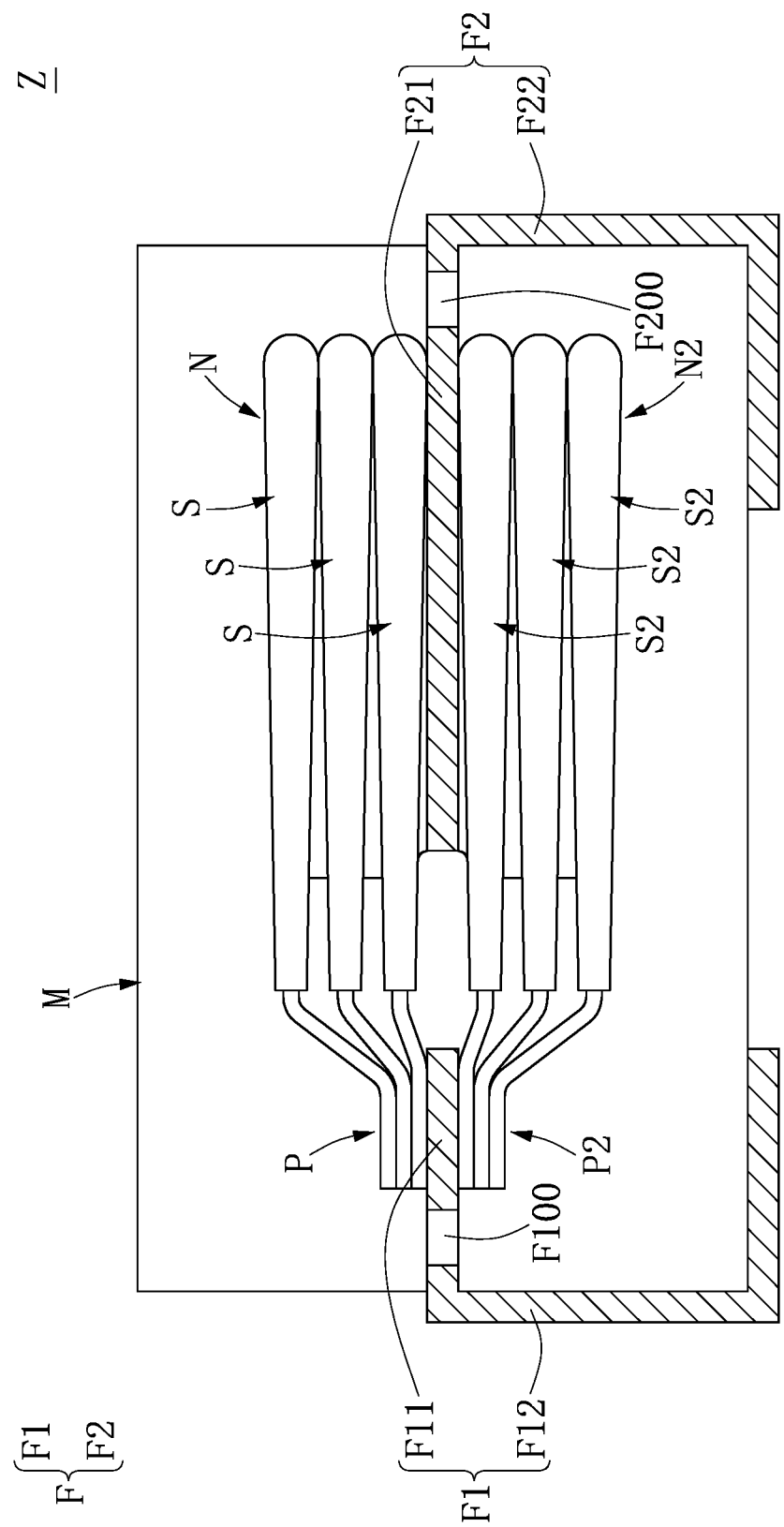
FIG. 7 is a cross-sectional view of a stacked type capacitor package structure according to a second embodiment of the present disclosure.

Referring to FIG. 7, a second embodiment of the present disclosure provides a stacked type capacitor package structure Z that does not require the use of a carbon paste layer, and includes a conductive bracket F, the plurality of stacked type capacitors S, and the package encapsulant M. It can be seen from the comparison between FIG. 7 and FIG. 6 that one of the differences between the second embodiment and the first embodiment is that the stacked type capacitor package structure Z of the second embodiment further includes a plurality of additional stacked type capacitors S2.

Further, the plurality of additional stacked type capacitors S2 are stacked in sequence and disposed between the at least one positive electrode conductive terminal F1 and the at least one negative electrode conductive terminal F2, and each additional stacked type capacitor S2 has a positive electrode terminal P2 and a negative electrode terminal N2. In addition, all of the plurality of additional stacked type capacitors S2 are covered by and embedded in the package encapsulant M, and the stacked type capacitors S and the stacked type capacitors S2 are respectively located on opposite lateral sides of the conductive bracket F.

Therefore, through the technical features of "the polymer composite layer 3 is formed on the oxide layer 2 to partially enclose the oxide layer 2" and "the silver paste layer 4 is directly formed on the polymer composite layer 3 to directly enclose the polymer composite layer 3," the stacked type capacitor S and the manufacturing method thereof, and the silver paste layer 4 allow the oxide layer 2 and the polymer composite layer 3 to be connected with each other to form the first connection interface C1 between the oxide layer 2 and the polymer composite layer 3, and allows the polymer composite layer 3 and the silver paste layer 4 to be directly connected with each other to form the second connection interface C2 between the polymer composite layer 3 and the silver paste layer 4.

It should be noted that the at least one first through hole F100 of the positive electrode conductive terminal F1 and the at least one second through hole F200 of the negative electrode conductive terminal F2 are filled by the package encapsulant M, so the bonding strength between the conductive support F and the package encapsulant M can be effectively increased, which further increases the structural strength of the stacked type capacitor package structure Z itself and the electrical characteristics that it provides.

The foregoing description of the exemplary embodiments of the present disclosure has been presented only for the purposes of illustration and description and is not intended to be exhaustive or to limit the present disclosure to the precise forms disclosed. Many modifications and variations are possible in light of the above teaching.

Certain embodiments were chosen and described in order to explain the principles of the present disclosure and their practical application so as to enable others skilled in the art to utilize the present disclosure and various embodiments and with various modifications as are suited to the particular use contemplated. Alternative embodiments will become apparent to those skilled in the art to which the present disclosure pertains without departing from its spirit and scope.

What is claimed is:

1. A manufacturing method for a stacked type capacitor without a carbon paste layer, comprising:
   providing a metal foil;
   forming an oxide layer on an outer surface of the metal foil to entirely enclose the metal foil;
   forming a polymer composite layer on the oxide layer to partially enclose the oxide layer; wherein the polymer composite layer includes 0.1-5% by weight of a poly (3,4-ethylenedioxythiophene):polystyrene sulfonate (PEDOT:PSS) composite, 1-30% by weight of a conductive auxiliary, 0.1-15% by weight of a hydrogen bond type adhesive, 0.01-5% by weight of a silane coupling agent, 0.5-5% by weight of a water-soluble resin, and 0.001-1% by weight of a polyamine compound; wherein the conductive auxiliary is selected from the group consisting of polyol, dimethyl sulfoxide (DMSO), and N-methyl-2-pyrrolidone (NMP); the hydrogen bond type adhesive is selected from the group consisting of sorbitol and polyvinyl alcohol; the water-soluble resin is selected from the group consisting of water-based polyurethane, water-based polyethylene, polyester, and water-based polymethylmethacrylate; and the polyol is selected from the group consisting of ethylene glycol, glycerol, polyethylene glycol, and polyglycefine; and
   forming a silver paste layer directly on the polymer composite layer to directly enclose the polymer composite layer;
   wherein the oxide layer and the polymer composite layer are connected with each other to form a first connection interface between the oxide layer and the polymer composite layer, and the polymer composite layer and the silver paste layer are connected with each other directly without the carbon paste layer to form a second connection interface between the polymer composite layer and the silver paste layer.

2. The manufacturing method for the stacked type capacitor without the carbon paste layer according to claim 1, further including:
surroundingly forming a surrounding barrier layer on an outer surface of the oxide layer to divide the outer surface of the oxide layer into a first portion and a second portion separate from the first portion,
wherein the polymer composite layer is formed on and completely encloses the second portion, the silver paste layer is formed on and completely encloses an outer surface of the polymer composite layer, and a first distance from an outer peripheral surface of the surrounding barrier layer to the oxide layer is greater than, smaller than, or equal to a second distance from an outer peripheral surface of the silver paste layer to the oxide layer.

3. The manufacturing method for the stacked type capacitor without the carbon paste layer according to claim 2, wherein an end of the polymer composite layer and an end of the silver paste layer are in contact with or separate from the surrounding barrier layer, and a length of the polymer composite layer and a length of the silver paste layer are restricted by the surrounding barrier layer.

4. The manufacturing method for the stacked type capacitor without the carbon paste layer according to claim 1, wherein the silver paste layer includes 40-90% by weight of silver powder, 0.1-5% by weight of a dispersant, 1-10% by weight of a water-soluble resin, and 5-40% by weight of a solvent; and
wherein the silver powder has a particle size between 1 and 50 μm; the dispersant is a hyperdispersant with an acid group or an amino group; the water-soluble resin is selected from the group consisting of water-based polyurethane, water-based polyethylene, polyester, and water-based polymethylmethacrylate; the solvent is selected from the group consisting of polyol, methyl ethyl ketone, methyl isobutyl ketone, and butyl acetate; and the polyol is selected from the group consisting of ethylene glycol, glycerol, polyethylene glycol, polyglycefine, ethylene glycol monobutylether, and ethylene glycol butyl ether.

5. A silver paste layer for a stacked type capacitor without a carbon paste layer, comprising 40-90% by weight of silver powder, 0.1-5% by weight of a dispersant, 1-10% by weight of a water-soluble resin, 5-40% by weight of a solvent; wherein the silver paste layer is disposed on a polymer composite layer;
wherein the polymer composite layer includes 0.1-5% by weight of a poly(3,4-ethylenedioxythiophene):polystyrene sulfonate (PEDOT:PSS) composite, 1-30% by weight of a conductive auxiliary, 0.1-15% by weight of a hydrogen bond type adhesive, 0.01-5% by weight of a silane coupling agent, 0.5-5% by weight of a water-soluble resin, and 0.001-1% by weight of a polyamine compound; wherein the conductive auxiliary is selected from the group consisting of polyol, dimethyl sulfoxide (DMSO), and N-Methyl-2-Pyrrolidone (NMP); the hydrogen bond type adhesive is selected from the group consisting of sorbitol and polyvinyl alcohol; the water-soluble resin is selected from the group consisting of water-based polyurethane, water-based polyethylene, polyester, and water-based polymethylmethacrylate; and the polyol is selected from the group consisting of ethylene glycol, glycerol, polyethylene glycol, and polyglycefine.

6. The silver paste layer for the stacked type capacitor without the carbon paste layer according to claim 5, wherein the polymer composite layer further including a chemically polymerized polymer bottom layer and a soluble nanoparticle polymer enclosing layer formed on the soluble nanoparticle polymer enclosing layer.

7. The silver paste layer for the stacked type capacitor without the carbon paste layer according to claim 5, wherein the polymer composite layer further including a soluble nanoparticle polymer bottom layer and a soluble nanoparticle polymer enclosing layer formed on the soluble nanoparticle polymer bottom layer.

8. The silver paste layer for the stacked type capacitor without the carbon paste layer according to claim 5, wherein the polymer composite layer further including a chemically polymerized polymer bottom layer, a soluble nanoparticle polymer bottom layer formed on the chemically polymerized polymer bottom layer, and a soluble nanoparticle polymer enclosing layer formed on the soluble nanoparticle polymer bottom layer.

9. The silver paste layer for the stacked type capacitor without the carbon paste layer according to claim 5, further includes 1-5% by weight of an emulsifier.

* * * * *